June 9, 1953 R. K-F SCAL ET AL 2,641,635

SUBMINIATURE ELECTRON TUBE CIRCUIT STRUCTURE

Filed Feb. 29, 1952 3 Sheets-Sheet 1

INVENTORS

ROBERT K-F SCAL

CLINTON O. LINDSETH

BY G. D. O'Brien

Q. Baxter Warner ATTORNEYS

SUBMINIATURE ELECTRON TUBE CIRCUIT STRUCTURE

Filed Feb. 29, 1952 3 Sheets-Sheet 2

INVENTORS
ROBERT K-F SCAL
CLINTON O. LINDSETH
BY G. D. O'Brien
Q. Baxter Warner
ATTORNEYS

SUBMINIATURE ELECTRON TUBE CIRCUIT STRUCTURE

INVENTORS
ROBERT K-F SCAL
CLINTON O. LINDSETH
BY G. D. O'Brien
O. Baxter Warner
ATTORNEYS Patented June 9, 1953 2,641,635

UNITED STATES PATENT OFFICE 2,641,635

SUBMINIATURE ELECTRON TUBE CIRCUIT STRUCTURE

Robert K-F Scal, Englewood, N. J., and Clinton O. Lindseth, Silva, N. Dak., assignors to the United States of America as represented by the Secretary of the Navy Application February 29, 1952, Serial No. 274,270

6 Claims. (Cl. 175—298)

(Granted under Title 35, U. S. Code (1952), sec. 266)

This device relates to the construction of a subminiature electron tube circuit, and more particularly to the physical arrangement of a plurality of multitube subminiature circuit components on a chassis, and to the support means and housing means for these assembled components.

Miniaturization of electronic circuits, due to advances in electronic technology providing complex and extensive circuitry for multicapacity functions has become increasingly important, especially where the size and weight of the device is limited, such as in aircraft installation. Some miniaturization has taken place, but with continued improvement in the circuitry to achieve greater accuracy and more complete and newer activities, the need for more extensive reductions in weight and volume to keep pace with the ever increasing development of an improved system has arisen. Attempted reductions in weight and volume have followed in general two paths, the reduction in the size of the elements themselves, and secondly the utilization of these miniature and subminiature components in improved chassis structures and housings enabling these subminiature units to be substituted for the larger devices while providing satisfactory performance. All such devices are required to occupy but a fraction of the weight and volume of the larger units, while handling the same amount of power with equivalent or improved performance. This basic requirement of power transmission alone indicates that these devices must dissipate the same amount of heat within smaller volume dimensions, and accordingly operate at much higher temperatures.

Other important problems which arise and are prevalent in all electronic circuits operating at relatively high frequencies, but more particularly noticeable and important in miniature circuits are the high frequency effects. The dimensions of the components themselves, the connecting wires, and the relative placement of the parts, whose effect may be negligible at low frequencies become increasingly important as the frequency is raised, allowing stray capacity and inductance to act as phase shifters and shunts, and allowing feedback to be generated producing oscillation and noise. In addition, the reduction in the size of the elements, while requiring these elements to perform the same function as the larger components, reduces their physical strength, rendering them less able to withstand the shocks and forces to which they may be subjected due to the high acceleration rates of the modern craft on which they are to be employed. Reduction in the size of these elements in connection with the narrow spacing permitted further renders the electrical wiring interconnections difficult and time consuming thereby impeding rapid manufacture and greatly increasing the cost of each unit.

To the end of minimizing these thermal, electrical and structural difficulties encountered in electronic circuit miniaturization, the present device is directed and in the embodiment illustrated there is provided a novel, light weight chassis construction and tube shielding member for a plurality of subminiature electron tubes and prepackaged circuit components adapted to compactly retain these circuit elements within an overall volume determined by little more than the size of the subminiature electron tubes and components while allowing ease of assembly, repair, and replacement, and providing structural rigidity, good electrical isolation and stability, and good thermal dissipation. In addition to this chassis structure there is provided a housing and supporting means for completely enclosing the chassis and electrically interconnected components mounted thereon which is small, compact, and extremely light in weight while providing a rugged support and allowing ready access to the circuit for repair or replacement of parts and units. The housing and supporting means including a number of interlocking members, additionally serves to complete the high frequency grounding and shielding of the circuit from other units and by conduction and radiation thermally cools the operating circuit components.

It is accordingly an object of this invention to provide a chassis structure to retain a plurality of electron tube circuit stages in compacted array permitting ease of assembly, repair, or replacement.

A further object of this invention is to provide a chassis structure adapted to retain a plurality of subminiature electron tube circuit stages in compact array and provide electrical shielding and minimize stage interaction for all components and connecting lines.

A further object of this invention is to provide a chassis for retainnig, electrically shielding, and thermally dissipating heat from a plurality of electrically interconnected circuit components.

A further object of this invention is to provide a housing for an assembled multistage subminiature electron tube circuit affording the circuit components improved mechanical, thermal, and electrical characteristics.

A further object of this invention is to provide an air tight housing and terminal connecting means for an electrical circuit including a linear array of subminiature electron tubes.

A further object of this invention is to provide housing means whereby a plurality of assembled electronic components may be handled as a unit and provided with quick disconnect electrical connections.

A further object of this invention is to provide a chassis for receiving all components of a multistage subminiature electron tube circuit in compact array while enabling rapid electrical interconnection, repair or replacement of any and all components.

Other objects and many of the attendant advantages of this invention will be readily appreciated as the same becomes better understood by reference to the following detailed description when considered in connection with the accompanying drawings wherein.

Figure 1:
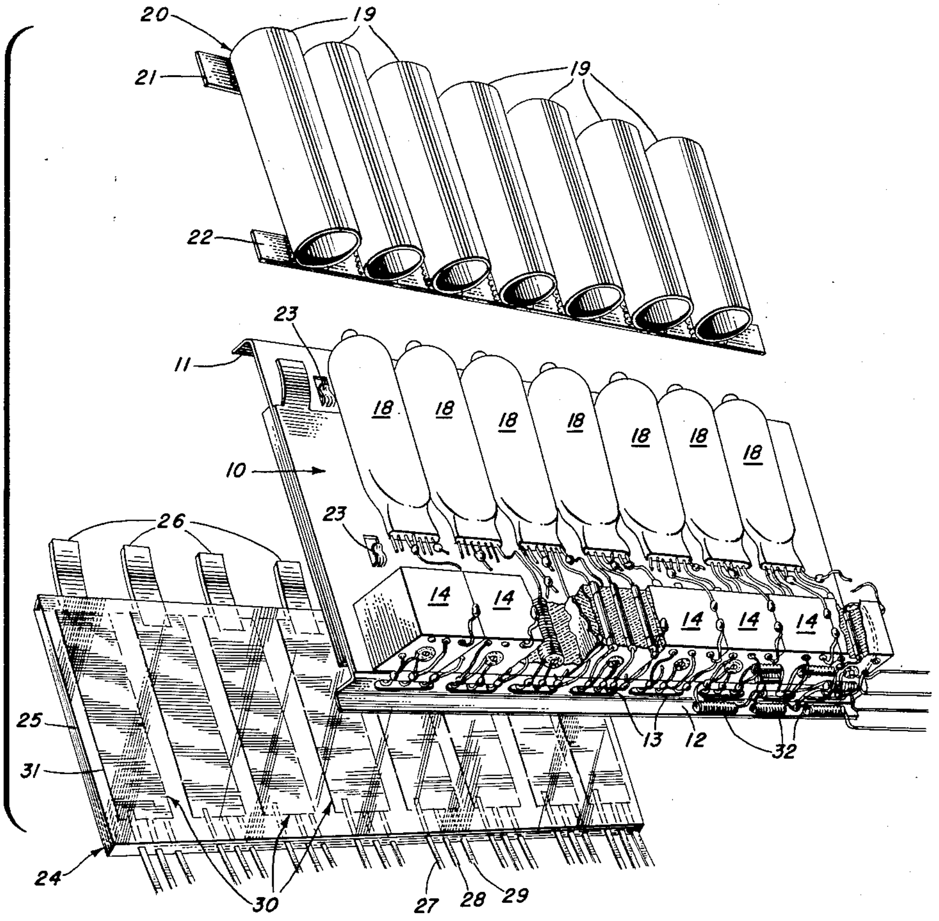
Fig. 1 is an exploded isometric view of the physical arrangement of circuit components on the chassis panel.
Figure 5:
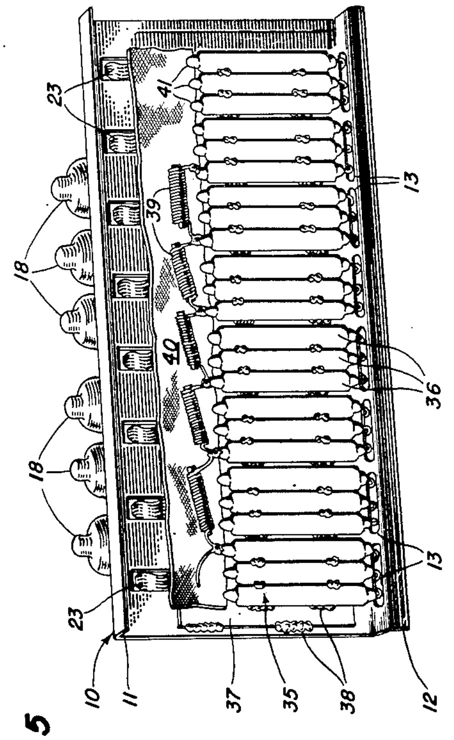
Fig. 5 is a rear elevation view of the panel and assembled circuit components employing a modified form of pre-packaged capacitor unit.

Referring now in detail to the drawings, Fig. 1 is an exploded view of the preferred chassis structure having mounted thereon the electrical components. Numeral 10 designates the basic mounting panel of this chassis comprising a rigid, rectangularly shaped planar member of sheet material, such as metal, having high electrical and thermal conductive properties. As shown this panel may have its upper edge 11 bent over to provide greater rigidity and for electrically shielding circuit components mounted upon the other side. The lower edge of this panel is preferably bent in substantially Z-shaped cross section to provide a flat narrow ledge 12 having a plane surface parallel to and spaced downwardly from the plane of the panel. A series of openings 13 are provided in the panel intermediate the flat panel surface and ledge 12 of the lower bent portion for enabling electrical wiring to interconnect components mounted on opposite sides of the panel as shown. A row of rectangular blocks 14 of nonconducting material, such as ceramic, are fastened in linear array adjacent to and across the lower edge of the panel on the front face. These blocks, more fully shown by Figs. 2, 3, and 4 directly below Fig. 1, each have cylindrical holes 15 running longitudinally therethrough for receiving a plurality of tubular subminiature electrical components (16 and 17, Fig. 3). When mounted within the blocks, it is important to note that all of these tubular electrical components are positioned in upright parallel relation. A row of subminiature electron tubes, each tube generally designated 18, are positioned in linear upright array across the front surface of panel 18, each of these electron tubes being parallel to the panel and preferably located immediately above a different one of the above-mentioned component holding blocks 14. The terminals extending from the electron tube bases are soldered to appropriate electrical circuit components, and these wires initially furnish the sole means of supporting the tubes in the position shown. Immediately above the panel 10 in exploded position therefrom is a row of electron tube shields generally designated 20, which comprises a plurality of cylinders 19, one to accommodate each electron tube, placed side by side and fastened adjacent either end by soldering or other joining means to two flat elongate rectangular strips 21 and 22. The cylinders 19 are preferably formed of thin, rigid material, such as brass, and are longer than the electron tubes they surround, enabling electrical shielding of the electron tube terminals wires at the tube bases in addition to shielding the tube. Two parallel rows of spaced spring fingers 23 are provided on the front face of the panel 10, the corresponding spring fingers of each parallel row positioned behind the electron tubes and substantially in line with their abutting sides as shown by Figs. 1 and 5. Upon the tube shields being positioned over the electron tubes, these spring fingers 23 engage the upper and lower tube shield supporting strips 21 and 27 holding these members firmly in place. The pressure supplied by these fingers against the supporting strips insures good electrical grounding contact between the panel and shields, enabling efficient electrical shielding of the electron tubes and interconnecting wires while permitting ready assembly and removal of the parts. In exploded position from the rear surface of panel 10 is a pre-assembled capacitor structure generally designated 24. This structure constituting one preferred means for uniting a plurality of capacitors within a compact array suitable for application within the present invention, comprises a plurality of physically and electrically isolated multisection capacitors 30 generally of rectangular configuration, placed in linear order and completely embedded and sealed within a single elongate rectangular parallelepiped 25 composed of dielectric material, such as glass. Each multisection capacitor 30 preferably includes a series of flat rectangular plates 31 of conducting material, such as metal foil, spaced one above the other and separated by means of the dielectric. A plurality of conducting strips or wires 26, 27, 28, and 29, penetrates two opposite edges of the parallelepiped shaped dielectric enclosure to make contact with the capacitor plates thereby enabling electrical circuit interconnection to be made thereto. For the given illustration, seven multisection capacitors are shown mounted side by side in a glass dielectric, each capacitor having three sections for a total of 21 capacitors. A common ground lead or strip 26 is brought out from the top edge of the dielectric holder 25 adjacent each three section capacitor unit, and three leads 27, 28, and 29 are brought out from the opposite edge of the dielectric holder 25 adjacent each three section capacitor unit 30. The latter leads are each connected to separate plates 31 capacitively coupled to the common ground plate.

The assembly and wiring of each of these components, component holders, and shielding members on the mounting panel 10 is quickly and easily performed. Initially the subminiature resistors (16, Fig. 2) and transformers 17 are fastened within the holes 15 provided in holding blocks 14, and these blocks fastened to the panel front face in linear order. Pre-assembled capacitor unit 24 is then fastened to the panel rear face, the ground leads 26 connected to this panel by soldering or other appropriate fastening providing stable electrical grounding, and the "hot" leads 27, 28, and 29 are soldered to the appropriate electrical components on the panel front face through opening 13 provided through the panel adjacent its lower ledge 12. Subminiature electron tubes 18 are then wired in with their bases adjacent corresponding mounting blocks 14, and tube shields 19 as a unit 20 slid over their corresponding electron tubes until the shield supporting members 21 and 22 are gripped by panel spring fingers 23 and 23. Should additional input or output circuit components such as resistors or inductors be needed for a given circuit configuration, tape resistors or printed circuits on readily mountable ceramic plates may be employed and positioned upon panel 10. Wire wound R.-F. chokes for purposes of decoupling may be further supplied, if desired, as shown by the coils 32 wound around miniature ferrite cores and mounted upon panel ledge 12 of Fig. 1.

Figures 2, 3, 4:
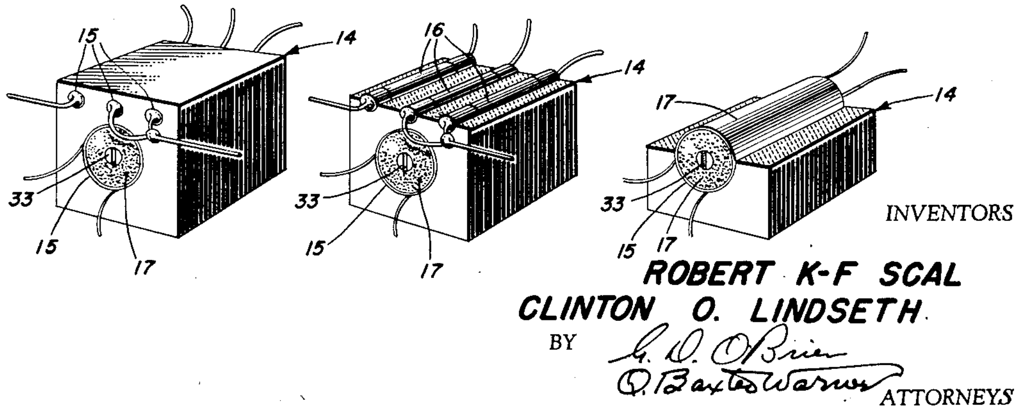
Fig. 2 is an isometric view of the pre-packaged resistors and transformers within their holding blocks.
Fig. 3 is an isometric view partly in section, similar to Fig. 2.
Fig. 4 is a second isometric view partly in section, similar to Fig. 2.

Figs. 2, 3, and 4 are enlarged isometric views of a mounting block 14 holding the subminiature tubular resistors 16 and subminiature tubular transformer 17, and showing by means of sectionalizing the block along two levels the details of these elements. Block 14 is comprised of a solid, hard, nonconducting material, such as ceramic, having holes 15 running longitudinally therethrough for receiving these tubular electrical components. The outer surfaces of these blocks may be metallized by applying and firing on silver paint at 700 degrees centigrade thereby providing good electrical shielding for the electrical components to be mounted within the block, as well as providing a surface which may be readily joined to the panel 10 by a simple soldering operation.

Tubular electrical resistors 16 may comprise any of three types, the first a conventional miniature carbon composition resistor commonly employed within conventional electronic circuits, the second a cracked-carbon on ceramic resistor approximately ⅜ of an inch in length and $\frac{1}{16}$ of an inch in diameter, and the third a printed or tape type applied and fired on a suitable base material such as steatite. The main considerations involved in selecting the preferred type depends not only upon its value and size but upon its fragility and operating temperature capacity, and accordingly in applications wherein these resistors are required to withstand high temperatures, the third type is preferred.

Tubular electrical inductors, and transformers 17 to obtain the necessary inductance value in as small a space as possible, are preferably wound directly upon tubular powdered iron cores and cemented in place by a suitable fastener such as silicon resin. The coils may be separated by extremely thin tape such as teflon tape .004 inch thick to provide a sufficiently high Q. and an additional layer of tape may be cemented over the windings to provide added protection during insertion into mounting block 14. Tuning of these subminiature inductors or transformers may be performed by threading into the center of the tubular powdered iron cores, ferrite rods 33, which may be adjustable to provide a tuning range, or finally tuned and thereafter cemented in place.

All of these tubular electrical components may be thereafter firmly cemented within mounting blocks 14 by means of silicon resin or other appropriate means to provide compact, shock resistant units.

Fig. 5 is a rear elevation view of the mounting panel 10 having the electrical components fastened and electrically wired thereon, and illustrating an alternative pre-packaged capacitor unit 35 mounted on the panel rear face. This alternative unit, generally designated 35, comprises a series of individual tubular capacitors 36 fastened in side by side order, preferably by a soldering connection, to a flat elongate rectanular grounding plate 37 of conducting material, such as metal. Each of these capacitors may be formed of a high dielectric ceramtic tube having a metallized outer surface of silver paint forming one of the capacitor plates, and having metal inserts within the tube forming the second capacitor plate, these inserts extending beyond the tube ends to enable electrical connection thereto. Thereafter grounding plate 37 may be connected by a soldering operation 38 to the rear face of panel 10, as shown, to provide a common ground connection for one side of the capacitors, and electrical wiring from the appropriate circuit components may be connected to the opposite capacitor end terminals through openings 13 in the panel 10 adjacent its lower ledge 12 to complete the capacitor circuit connection. A strip of nonconducting material 40 may be positioned intermediate the capacitor upper terminals 41 and grounding plate 37 for enabling subminiature electrical components, such as wire wound decoupling chokes 39, to be mounted adjacent the panel rear face above the capacitors 36 and wired to their end terminals as shown without danger of shorting these components or terminals.

Figure 6:
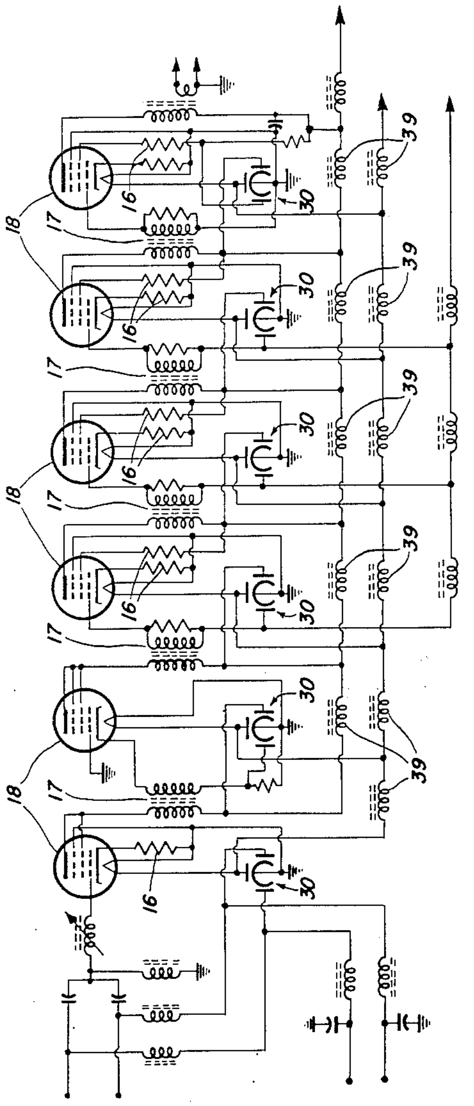
Fig. 6 is a schematic diagram of the electrical circuit.

Fig. 6 is a schematic circuit diagram representing the electrical components and their wiring in the presently proposed system, and comprises a six tube intermediate frequency amplifier having a center frequency of 30 megacycles and an overall band width of approximately 2.5 megacycles. The first two stages comprise a low noise input, and the following four stages comprise substantially identical synchronously tuned intermediate amplifier stages. The schematically represented components of Fig. 6 are numbered to correspond with the physically represented components as shown by Figs. 1–4 inclusive, enabling a comparison of the physical placement of these components on the chassis panel with their electrical position in the circuit, with a view toward eliminating undesired electrical interaction while enabling a compact, readily producible and repairable structural configuration. However, since the physical arrangement of components as shown by Figs. 1–5 inclusive, is primarily directed to the solving of electrical, structural, and thermal problems occurring in the miniaturization of many types of circuitry, and is therefore not limited to the intermediate frequency amplifier of Fig. 6, further details of this particular circuit are believed unnecessary.

*Housing*

Figures 7, 8, 9:
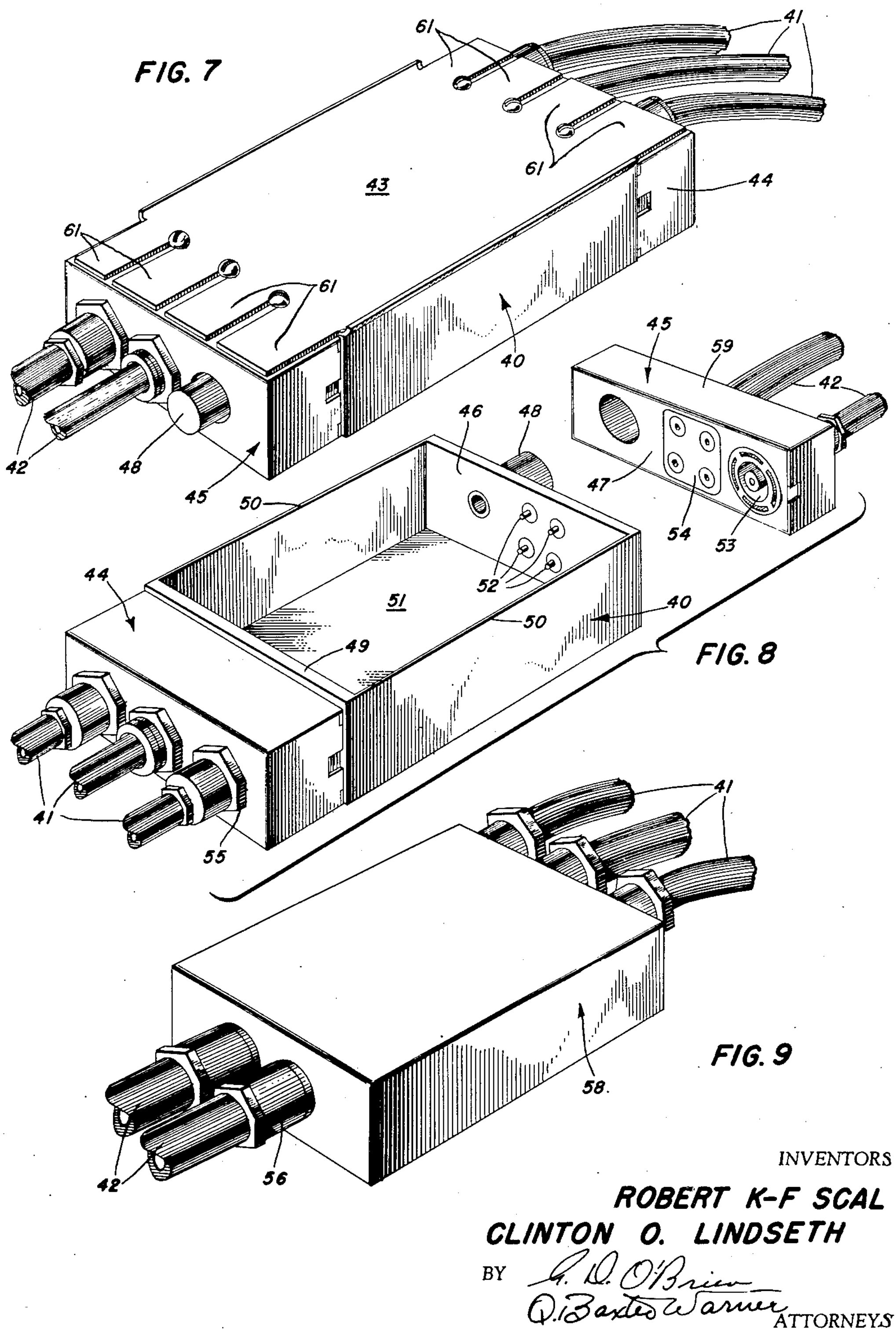
Fig. 7 is an isometric view of the circuit housing and support means furnished with quick disconnect electrical plug connectors.
Fig. 8 is an exploded isometric view similar to Fig 7.
Fig. 9 is an isometric view of an alternative circuit housing and support means.

Fig. 7 is an isometric view of one preferred embodiment of the support and housing members for completely enclosing the assembled and wired circuit components of Fig. 1. This housing is small, compact, and extremely light in weight, and provides good high frequency grounding and shielding of the circuitry, high thermal conduction and radiation for cooling the operating components, while enabling quick electrical connect and disconnect means for ready insertion or replacement of the housed circuit in a given system.

Fig. 8 is a partially exploded isometric view of this housing clearly showing some of its parts, including a case 40 for receiving the assembled circuitry, an input plug 44 mateable with one end of the case 40 for supplying input and control signals to the case enclosed circuit, and an output plug 45 mateable with the opposite end of the case 40 for supplying the power supply voltages and taking output signals from the case enclosed circuit. Case 40 comprises a rectangularly shaped hollow box whose dimensions are selected to compactly contain and support the assembled subminiature circuit. Sides 50 and base 51 of this case may be formed of thin, rigid metal having some spring action such as Phosphor bronze .015 inch thick, while end pieces 46 and 49 preferably comprise rectangular plates of brass having a thickness of ⅛ of an inch. Quick disconnect electrical fittings 52, which may include coaxial connections and pins utilizing glass Kovar seals adapted to mate with companion fittings i. e. 54 and 53 on the input and output plugs 44 and 45, are hermetically embedded in the end plates 46 and 49 to furnish electrical interconnection from the input and output cables 41 and 52 through the plugs 44 and 45 and case end pieces 49 and 46 to the enclosed circuitry. A cover (43, Fig. 7) preferably of the same material as the case sides 50 and base 51 is adapted to complete the case side and end enclosure and enable hermetic sealing of the circuitry in an inert atmosphere should this be desirable.

Hermetic sealing or more specifically sealing the assembled circuitry within the case, evacuating the air within the case, and thereafter filling the case with an inert atmosphere, is desirable for retarding the rapid deterioration of electrical components resulting from their high operating temperatures when compactly assembled in the configuration of Fig. 1 and enclosed by case 40. For performing the hermetic sealing of the enclosed circuitry, an open ended tube 48 may be fastened within an opening provided in case end piece 46 (as shown) and by successive operations the air evacuated from the case through this tube and an inert gas inserted into the case. Thereafter tube 48, preferably made of a soft metal such as copper, may be clipped off and the opening sealed thereby preventing the escape of inert gas and completing the hermetic enclosure.

As shown by Fig. 7, cover plate 43 may have a series of fingers 61 extending beyond the ends of case 40, and as this cover is preferably made of a metal having a spring action, such as Phosphor bronze, these fingers frictionally grip the sides of input and output plugs 44 and 45 to provide a holding means making good thermal and electrical contact with these plug members.

Fig. 9 is an alternative housing and support means for enclosing the chassis mounted subminiature components of Fig. 1. It differs from that of Figs. 7 and 8 in having the input and output cables 41 and 42 terminated in fittings which may be directly attached to the case thereby eliminating the quick disconnect input and output plugs 44 and 45 and effecting a space saving through this elimination. Basically the case 40 of Fig. 8 remains unchanged with the exception of the electrical fittings (not shown) which interconnect the input and output cable conductors to the enclosed subminiature circuit terminals through the case end pieces 46 and 49. A suitable form fitting, metallic covering 58 may enclose the case as shown to retain these fittings, or the end pieces 46 and 49 of case 40 may themselves be modified to serve as retaining means for the cable fittings. In the latter event, the input and output cable terminals are preferably soldered directly to the appropriate circuit terminals within the case. Should hermetic sealing be considered desirable cable termination fittings employing glass-Kovar seals may be installed and sealed by a soldering operation to the case end plates. The cable conductors may then be fastened outside the case to these glass-Kovar fittings.

Summarizing, the above device provides a chassis structure for compactly and ruggedly mounting, electrical shielding, and thermally cooling all components of a multitube subminiature electronic circuit by means of fastening or "self-jigging" substantially all components of given types together within separate holding members, and mounting these members upon opposite sides of a specially constructed chassis panel. The holding members and panel of such configuration and material that components of one given type are physically isolated and electrically shielded from those of other types. The placement of all components are effectively in layers parallel to and adjacent the surface of the chassis panel whereby the panel may serve as an electrical, thermal, and structural stabilizing member. In addition a series of linearly interconnected tube shields are provided and supported by a conducting strip which is adapted to detachably engage the chassis panel with the tube shields parallel thereto. Two alternative housing and support means are provided to totally enclose the physically assembled circuitry, support this circuitry, shield it from fields generated by other units, and cool the operating components.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A chassis structure for a multitube subminiature circuit array comprising: a conductive panel having two parallel rows of spaced spring fingers, two elongate strips, the fingers of each row removably engaging a different one of these strips, a plurality of subminiature tube shields fastened in linear parallel alignment transverse to both strips and having their longitudinal axis parallel to the plane of the panel, whereby these shields may be quickly detached from the panel as a unit.

2. A chassis structure for compactly receiving a plurality of electron tubes, transformers, resistors, and capacitors comprising: a panel having means for receiving said capacitors in linear order each adjacent the surface on one side thereof, and having means for receiving said plurality of resistors and transformers with their longitudinal axis parallel, adjacent the surface on the opposite side thereof, friction holding means on the panel above said opposite side receiving means, at least one supporting member, a plurality of tube shields fastened in linear array to said supporting member the sides of each shield abutting that of the next, the friction holding means engaging the supporting member for removably fastening the shields to the panel with their sides parallel thereto, whereby the spaces defined above the resistor and transformer receiving means and confined within the tube shields are adapted to receive said plurality of election tubes.

3. A chassis structure for compactly retaining all components and tubes of a multitube electronic circuit comprising: a conductive panel having two plane surfaces, a plurality of multicomponent holding means attached in linear side by side order adjacent one plane surface thereof, friction retaining means on said one plane surface positioned above the holding means, at least one supporting member, a plurality of electron tube shields fastened in line to the supporting member, the friction holding means adapted to engage the supporting member for removably fastening the shields to the panel above the holding means with their sides parallel thereto, whereby the spaces defined above the holding means and confined within the tube shields may receive the electron tubes of the circuit with their longitudinal axis parallel to the panel planar surface.

4. In the chassis structure of claim 3, a second type component retaining means attached adjacent the second plane surface, said panel having a plurality of openings therethrough adjacent each multicomponent holding means, enabling electrical interconnection of components on opposite sides of the panel while electrically shielding these components.

5. A chassis structure for compactly receiving and holding a plurality of subminiature electron tubes and subminiature electrical components comprising: a conductive panel having two parallel faces, a plurality of nonconducting holding blocks fastened in linear array across the front face of the panel, each block having a plurality of holes running therethrough parallel to the panel face for receiving subminiature electrical components of given types, an additional holding means fastened to the panel rear face, said additional means adapted to retain electrical components of another type in linear array parallel to the panel rear face, a unit including a plurality of tube shields connected in linear order, means on the panel front face for removably holding this unit with the individual shield sides adjacent the panel face and directly above a different one of the holding blocks, whereby the spaces defined within the tube shields may receive said electron tubes with their bases adjacent the holding blocks.

6. In the structure of claim 5 the holding blocks having a conductive covering about their outer surfaces to provide electrical shielding for components mounted therein.

ROBERT K-F SCAL.
CLINTON O. LINDSETH.

References Cited in the file of this patent

UNITED STATES PATENTS

| Number | Name | Date |
|---|---|---|
| 2,046,927 | Riley | July 7, 1936 |
| 2,444,302 | Lybarger | June 29, 1948 |
| 2,499,589 | Kennedy | Mar. 7, 1950 |

OTHER REFERENCES

Proceedings of the I. R. E.; October, 1950; pages 1139 to 1145. An article: New Techniques for Electronic Miniaturization.